United States Patent
Lynch et al.

(10) Patent No.: US 7,305,455 B2
(45) Date of Patent: Dec. 4, 2007

(54) INTERFACING OBJECTS AND MARKUP LANGUAGE MESSAGES

(75) Inventors: Peter J. Lynch, Charlotte, NC (US); Brenda H. High, Charlotte, NC (US)

(73) Assignee: International Business Machines Corporation, Armonk, NY (US)

( * ) Notice: Subject to any disclaimer, the term of this patent is extended or adjusted under 35 U.S.C. 154(b) by 762 days.

(21) Appl. No.: 10/103,001

(22) Filed: Mar. 21, 2002

(65) Prior Publication Data

US 2003/0182395 A1 Sep. 25, 2003

(51) Int. Cl.
*G06F 9/00* (2006.01)
*G06F 17/24* (2006.01)

(52) U.S. Cl. ............... 709/218; 719/311; 715/500; 715/513; 707/3; 709/203

(58) Field of Classification Search ............ 709/218, 709/203; 715/500, 513; 719/311; 707/3
See application file for complete search history.

(56) References Cited

U.S. PATENT DOCUMENTS

| | | | | |
|---|---|---|---|---|
| 6,067,414 | A | 5/2000 | Wang et al. | 395/702 |
| 6,125,391 | A | 9/2000 | Meltzer et al. | 709/223 |
| 6,253,366 | B1 | 6/2001 | Mutschler, III | 717/1 |
| 6,263,332 | B1* | 7/2001 | Nasr et al. | 707/5 |
| 6,279,015 | B1 | 8/2001 | Fong et al. | 707/523 |
| 6,289,501 | B1 | 9/2001 | Mutschler, III | 717/1 |
| 6,330,569 | B1 | 12/2001 | Baisley et al. | 707/203 |
| 6,621,505 | B1* | 9/2003 | Beauchamp et al. | 715/764 |
| 6,738,975 | B1* | 5/2004 | Yee et al. | 719/310 |
| 6,810,429 | B1* | 10/2004 | Walsh et al. | 709/246 |
| 6,854,120 | B1* | 2/2005 | Lo et al. | 719/311 |
| 6,871,204 | B2* | 3/2005 | Krishnaprasad et al. | 707/102 |
| 6,874,146 | B1* | 3/2005 | Iyengar | 719/313 |
| 6,904,432 | B2* | 6/2005 | Charlot et al. | 707/9 |
| 7,130,842 | B2* | 10/2006 | Lynch et al. | 707/3 |
| 2001/0032218 | A1 | 10/2001 | Huang | 707/513 |
| 2001/0047372 | A1 | 11/2001 | Gorelik et al. | 707/514 |
| 2002/0002566 | A1 | 1/2002 | Gajraj | 707/513 |
| 2002/0010781 | A1 | 1/2002 | Tuatini | 709/227 |
| 2002/0013790 | A1 | 1/2002 | Vandersluis | 707/514 |
| 2002/0040359 | A1* | 4/2002 | Green et al. | 707/3 |
| 2002/0169788 | A1* | 11/2002 | Lee et al. | 707/104.1 |
| 2003/0140095 | A1* | 7/2003 | Simpson et al. | 709/203 |
| 2003/0182271 | A1* | 9/2003 | Lynch et al. | 707/3 |
| 2004/0123302 | A1* | 6/2004 | Lo et al. | 719/310 |
| 2004/0205573 | A1* | 10/2004 | Carlson et al. | 715/513 |

FOREIGN PATENT DOCUMENTS

| | | |
|---|---|---|
| CA | 2255017 | 5/2000 |
| EP | 1 037 151 | 9/2000 |
| EP | 1 122 652 | 8/2001 |
| KR | 2001067859 | 7/2001 |

OTHER PUBLICATIONS

M. Biscarrat, *XML@SAP*, SAP AG, <http://www.sap.com>, (2001).

(Continued)

*Primary Examiner*—David Wiley
*Assistant Examiner*—Alina N. Boutah
(74) *Attorney, Agent, or Firm*—Akerman Senterfitt

(57) ABSTRACT

A method of automatically generating a markup language message from an application specific interface object, as well as generating an application specific interface object from a markup language message is provided. The method can include receiving an application specific interface object and identifying an object table specified therein. Objects listed in the object table can be automatically identified. The objects can be serialized by representing the objects in the markup language message. The resulting markup language message can be a representation of the application specific interface object.

5 Claims, 3 Drawing Sheets

OTHER PUBLICATIONS

*Ariba Buyer MQSeries Integration White Paper*, IBM Corp., <http://www-3.ibm.com/software/ts/mqseries/adapter/ws/library/ariba/whitepaper.html>, (Viewed Feb. 25, 2002).

*Interface Repository (IFR) for Collaborative Business Scenarios*, SAP, <http://ifr.sap.com/home/Documents/ifr.htm>, (Viewed Feb. 13, 2002).

C. Ruey-Shun et al., A Web-Based Data Extraction System for Supply Chain Management Using SAP R/3, *Proc. of IEEE Int. Conf. on Systems, Man and Cybernetics*, vol. 4, pp. 2557-2562 , (Oct. 7-10, 2001).

The XML Scorecard for 3Q00, *Software Economics Letter*, vol. 9, No. 8, pp. 1-3, (Aug. 2000).

T. Dubernet, et al., Base System Products-Product Data Management With Technological Variety, *ComTec*, vol. 78, No. 4, pp. 28-32, (2000).

M. Aleksy, et al., Interoperability of Java-Based Applications and SAP's Business Framework State of the Art and Desirable Developments, *Proc. of Int. Symp. On Distributed Objects and Applications*, pp. 190-200, (1999).

D. Ritter, XML: The Missing Link for B2B E-Commerce, *Intelligent Enterprise*, vol. 2, No. 7, pp. 30-32-36-37, (May 11, 1999).

*Seeburger Receives Official SAP XML Certification for the BIS/SAP XML Interface*, <http://www.swwburger.com>, 2000.

J. Schwartz, SAP Embraces Java and XML, *InternetWeek*, <http://www.internetweek.com/news1298/news121098-9.htm>, (Dec. 10, 1998).

Chopra, et al., XML-EDI Application Architecture, *Research Disclosure*, N. 450, Art. 92, p. 1722 (Oct. 2001).

Conversion of Final Form Data, Such as AFP, to XML, *Research Disclosure*, No. 444, Art. 208, p. 709, (Apr. 2001).

bTalk—Web-Enabling SAP, *Backsoft Corp.*, <http://www.btalk.com/content_btalkxml.cfm>, (Viewed Feb. 13, 2002).

Method and Program to Generate Abritrary XML from a Java Hash Table . . . , *Research Disclosure*, No. 440, Art. 132, (Dec. 10, 2000).

Program Using XML to Generate Programming Tools For A Complex Program . . . , *Research Disclosure*, No. 434, Art. 153, (Jun. 10, 2000).

\* cited by examiner

INTERFACING OBJECTS AND MARKUP LANGUAGE MESSAGES

BACKGROUND OF THE INVENTION

1. Technical Field

The invention relates to the field of application integration, and more particularly, to the generation of application interfaces which support standard and user defined application data objects.

2. Description of the Related Art

When interfacing two or more applications, many different problems can arise. This is especially true in the case where disparate enterprise resource planning (ERP) systems are interfaced through a middleware system. Importantly, both data issues and application programming interface (API) issues must be resolved before the applications can interact effectively. Oftentimes, API issues arise because ERP system interfaces can be customized to such a large extent to suit the particular business needs of each customer. In addition to API modifications, the underlying data model of many ERP systems also can be modified to suit a customer's specific requirements. Such is the case, for example, with the Ariba (™) Buyer procurement application which is part of a comprehensive business-to-business platform available from Ariba, Inc. of Sunnyvale, Calif. Because the Ariba Buyer data model can be modified to meet each customer's specific requirements, the interfaces and associated meta data objects describing those interfaces also are unique.

Further complicating the issue, is that some ERP systems require additional data to properly interface with other applications. For example, if the ERP system is to interface with an accounting application, a data structure referred to as a variant can be defined within the ERP system for storing information which is specific to the accounting application. The accounting variant can hold information that is pertinent to the ERP system, as well as certain information that is specific to the accounting application to be interfaced with the ERP system. The inclusion of such information within an ERP system leads to further customization of the underlying data model and APIs.

Because of the high degree of API and data model customization within ERP systems and applications, developers have turned away from developing a standard integration interface capable of meeting each customer's needs. Instead, developers have embraced several different techniques for interfacing ERP systems and/or applications to messaging middleware. One technique frequently relied upon by developers has been the development of custom coded solutions. Conventional custom coded solutions, however, frequently do not allow for future customization or enhancements to the ERP system without creating new custom code. In consequence, accommodating for customer modifications and variants can be problematic when implementing a custom interface solution.

Another technique for developing integration interfaces has been to capture application meta data in a database repository. As is known to those skilled in the art, meta data can provide a description of an interface to an application, in this case an ERP system interface object. One benefit of the database technique is that all of the ERP system meta data is contained within a central repository. Still, the database technique does have disadvantages. In particular, the use of a database introduces another potential point of failure into a system. Another disadvantage of the database technique is that the overall runtime performance of a system can be decreased due to the frequent calls to the database to access the ERP system meta data necessary for processing events. Finally, the customer needs specific knowledge of the application interface which may require the employment of specialized information technology personnel.

SUMMARY OF THE INVENTION

The invention disclosed herein provides a markup language message and application specific object interface. In particular, the present invention enables enterprise resource planning (ERP) systems and applications to interact with one another using a single, flexible interface solution, rather implementing a series of custom coded interfaces. As a result, the present invention does not require a meta data repository for operation. The present invention can dynamically generate a markup language representation of an ERP system interface object as well as generate and process a markup language representation of an interface object.

The present invention can serialize an interface object to an extensible markup language (XML) representation, thereby creating a non-customer specific application interface. The serialization of the interface object can encapsulate any custom changes of the particular object into a format which can more readily be transformed using various tools such as adapter builders, XML editors, and interactive development tools. In consequence, the information that is needed to generate or process an XML message is available at runtime. The application interface also is reusable and need not be enhanced as a result of customization of an ERP system.

One aspect of the present invention can include a method of automatically generating a markup language message, for example an XML message, from an application specific interface object. The method can include receiving an application specific interface object and identifying an object table specified by the application specific interface object. A key for the object table can be identified for accessing entries of the object table. Objects listed in the object table can be automatically identified.

The objects can be processed to determine whether the objects represent a subclass. If so, the subclass can be represented as a parent element within the markup language message. Additionally, attributes of the subclass can be identified and represented as sub-elements of the parent element within the markup language message. Non-subclass data objects can be represented as single entries in the markup language message. Accordingly, the objects can be serialized by representing the objects in the markup language message such that the resulting markup language message is a representation of the application specific interface object.

Another aspect of the present invention can include a method of generating an application specific interface object from a markup language message representing the application specific interface object. The method can include determining the identity of the application specific interface object as specified by the markup language message. The markup language message, which can be an XML message, can be parsed to identify objects and associated attributes of the application specific interface object represented by the markup language message. For example, the parsing step can include comparing elements of the markup language message to determine a data type of the objects specified by the elements and determining whether the objects represent a subclass by identifying sub-elements associated with the compared elements representing objects. If the application specific interface object is determined to be a subclass, then the sub-elements can be recursively processed and represented as another object in the object table. In any case, the identified objects and associated parameters can be included within an object table to generate the application specific interface object according to the markup language message and the determined objects and associated attributes.

BRIEF DESCRIPTION OF THE DRAWINGS

There are shown in the drawings embodiments which are presently preferred, it being understood, however, that the invention is not limited to the precise arrangements and instrumentalities shown.

DETAILED DESCRIPTION OF THE INVENTION

The invention disclosed herein provides a markup language and application specific object interface. In particular, the present invention enables enterprise resource planning (ERP) systems and applications to interact with one another using a single, flexible interface solution, rather than implementing a series of custom coded interfaces or utilizing a database for housing meta data. According to the present invention, markup language representations of ERP system interface objects can be dynamically generated; and, ERP system interface objects can be dynamically generated and processed from markup language messages representing the interface objects.

Figure 1:
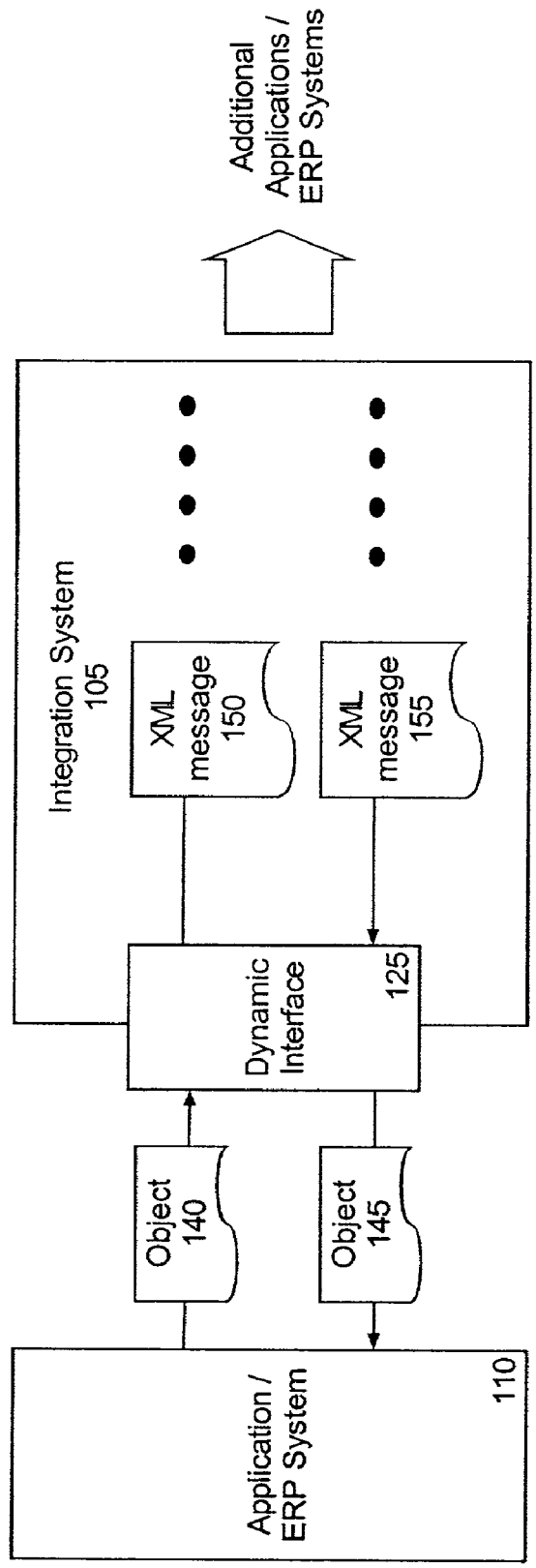
FIG. 1 is a schematic diagram illustrating a system for interfacing two disparate applications and/or enterprise resource planning systems in accordance with the inventive arrangements disclosed herein.

FIG. 1 is a schematic diagram illustrating a system for interfacing disparate applications and/or ERP systems in accordance with the inventive arrangements disclosed herein. As shown in FIG. 1, the system can include a integration system or application 105 and an application or ERP system 110. The ERP system 110 can be a multi-module application which helps organizations manage diverse aspects of their business such as product planning, parts purchasing, maintaining inventories, interacting with suppliers, providing customer service, and tracking orders. The ERP system 110 further can manage financial and human resource aspects of a business. One example of such an ERP system is the Ariba (™) Buyer procurement application which is part of a comprehensive business-to-business commerce platform available from Ariba, Inc. of Sunnyvale, Calif.

The ERP system 110 can include an interface which allows user defined channels to listen for triggered events or interface objects that are used to provide data to external systems and/or applications. The ERP system 110 can initiate a process through an integration event. The process can communicate through the channel that registers a subscription for this event, and accordingly, the outbound interface object can be provided via the registered channel. Each integration event can specify an integration schema to represent the parameters for sending data to an external system, for example in an outbound object, as well as parameters for receiving data from an external system. The ERP system 110 further can include an application programming interface defining an object interface for receiving inbound data from external systems and/or applications.

The integration system 105 can translate one proprietary ERP system message format, whether an object or a markup language message such as an extensible markup language (XML) message representing an object, to another proprietary ERP system message format. Through its various software components, the integration system 105 can provide a communication mechanism between applications on different platforms. Thus, the integration system 105 can provide messaging infrastructure to facilitate interactions between the ERP system 110 and additional ERP systems and/or applications. The integration system 105 can include a message queue 120 for interacting with the ERP system 110. A dynamic interface 125 also can be included for processing received data objects and generating XML representations of those objects. The dynamic interface 125 further can generate data objects from XML representations of the data objects.

The integration system 105 can be configured as a listener for particular events of the ERP system 110. Thus, in operation, the ERP system 110 can provide interface object 140, for example an Ariba Buyer Java object, to the integration system 105. The interface object 140 can be published to the dynamic interface 125. The dynamic interface 125 then can process the interface object 140 to generate an XML representation, for example XML message 150, of the received interface object 140. The XML message 150 then can be format converted or used to generate information which is formatted for use by another different ERP system or application.

XML message 155 can be an XML representation of information received from another ERP system or application. In that case, the dynamic interface 125 can generate an ERP system object, for example an Ariba Buyer Java object, according to the XML message 155. The resulting interface object 145 can be passed to the ERP system 110.

Figure 2:
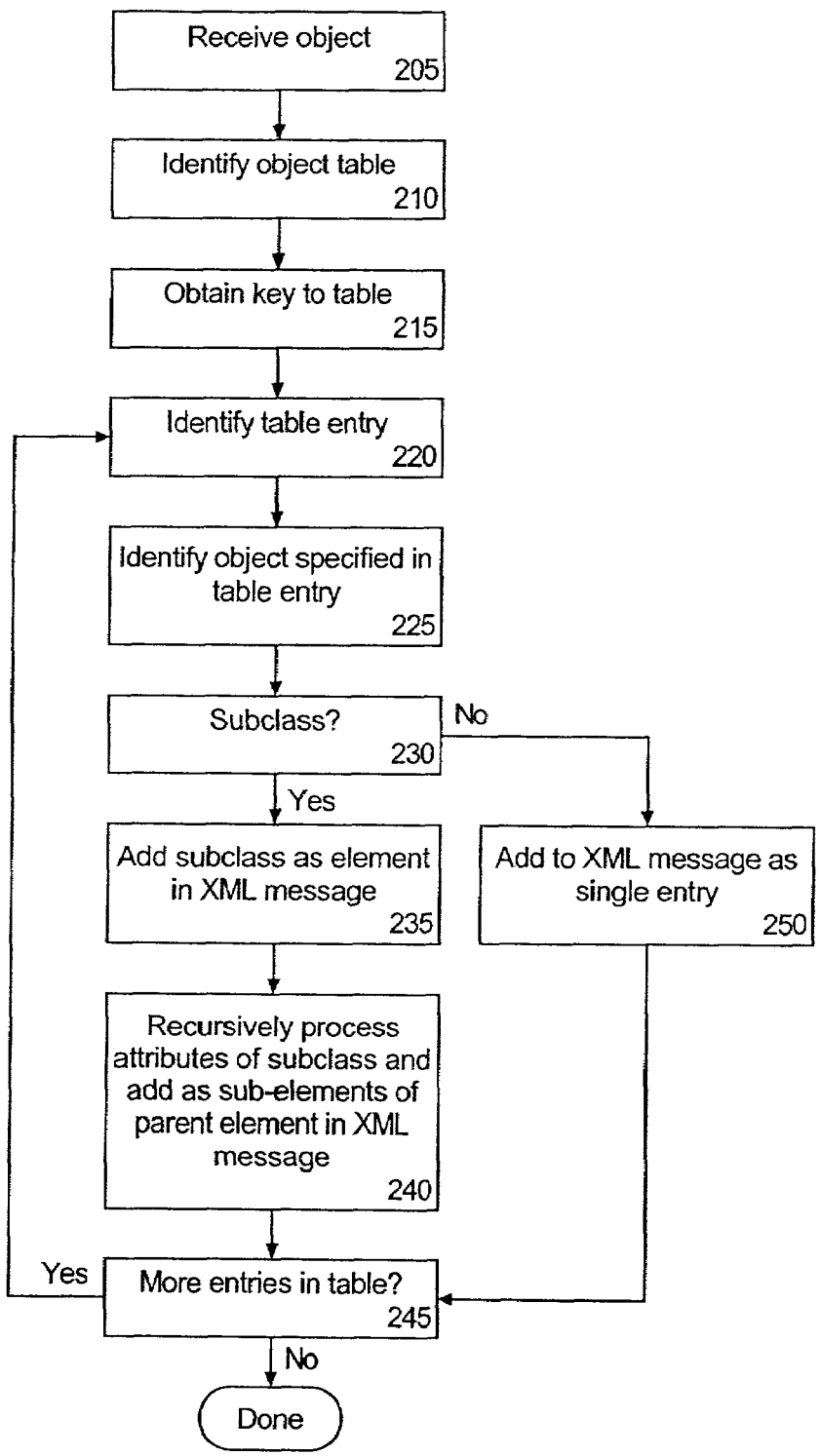
FIG. 2 is a flow chart illustrating a method of determining a markup language representation of an object.

FIG. 2 is a flow chart illustrating a method of determining a markup language representation of an application specific object. The method of FIG. 2 can begin in a state wherein an ERP system has sent an outbound interface object to an external application or system. Accordingly, in step 205, the interface object can be received, for example by an integration system. In step 210, an object table specified by the received interface object can be identified. The object table can specify the type of interface object being received as well as any constituent objects included in the interface object. Although the object table can be embodied as any of a variety of different data structures, according to one embodiment of the present invention, the object table can be specified as a hash table.

In step 215, in the case where the object table is specified as a hash table, a key for the object table can be obtained. The key, for example, can be located at a predetermined location within the interface object or specified by a predetermined parameter of the interface object. In any case, having identified the object table, an XML representation of the received interface object can be generated. Accordingly, in step 220, a table entry can be identified from the object table. In step 225, the object specified by the table entry can be identified. Beginning in step 230, the parameters of the object identified in step 225 can be queried. For example, in step 230, a determination can be made as to whether the object is a subclass. If so, the method can continue to step 235. If not, the method can continue to step 250, where the object can be added to the XML message being generated as a single entry or element.

If the object was determined to be a subclass, in step 235, the subclass can be added as an element of the XML message being generated. Accordingly, in step 240, the attributes of the subclass can be recursively processed. More specifically, the attributes of the subclass can be added to the XML message being generated as sub-elements of their parent element. In step 245, a determination can be made as to whether additional entries in the object table remain to be processed. If so, the method can loop back to step 220 to identify a next object table entry. The method can continue until each of the table entries has been processed.

Upon completion of the method of FIG. 2, an XML representation of the received ERP system interface object has been generated. Notably, serializing the interface object to XML in this fashion can create a non-customer specific application interface. In particular, the serialization of the interface object encapsulates any custom changes of the particular interface object into a format which can more readily be transformed using various tools such as adapter builders, XML editors, and interactive development tools. Pseudo code illustrating the generation of an XML representation of an interface object is provided in Appendix A.

The flow chart of FIG. 2 indicates that the elements and sub-elements can be added to the XML message as the classes and subclasses of the interface object are processed. Those skilled in the art will recognize that the elements and sub-elements need not be added to the XML message as the classes and subclasses are processed. Rather, the elements and sub-elements can be temporarily stored and periodically written to the XML message, or written to the XML message after processing the entire interface object.

Figure 3:
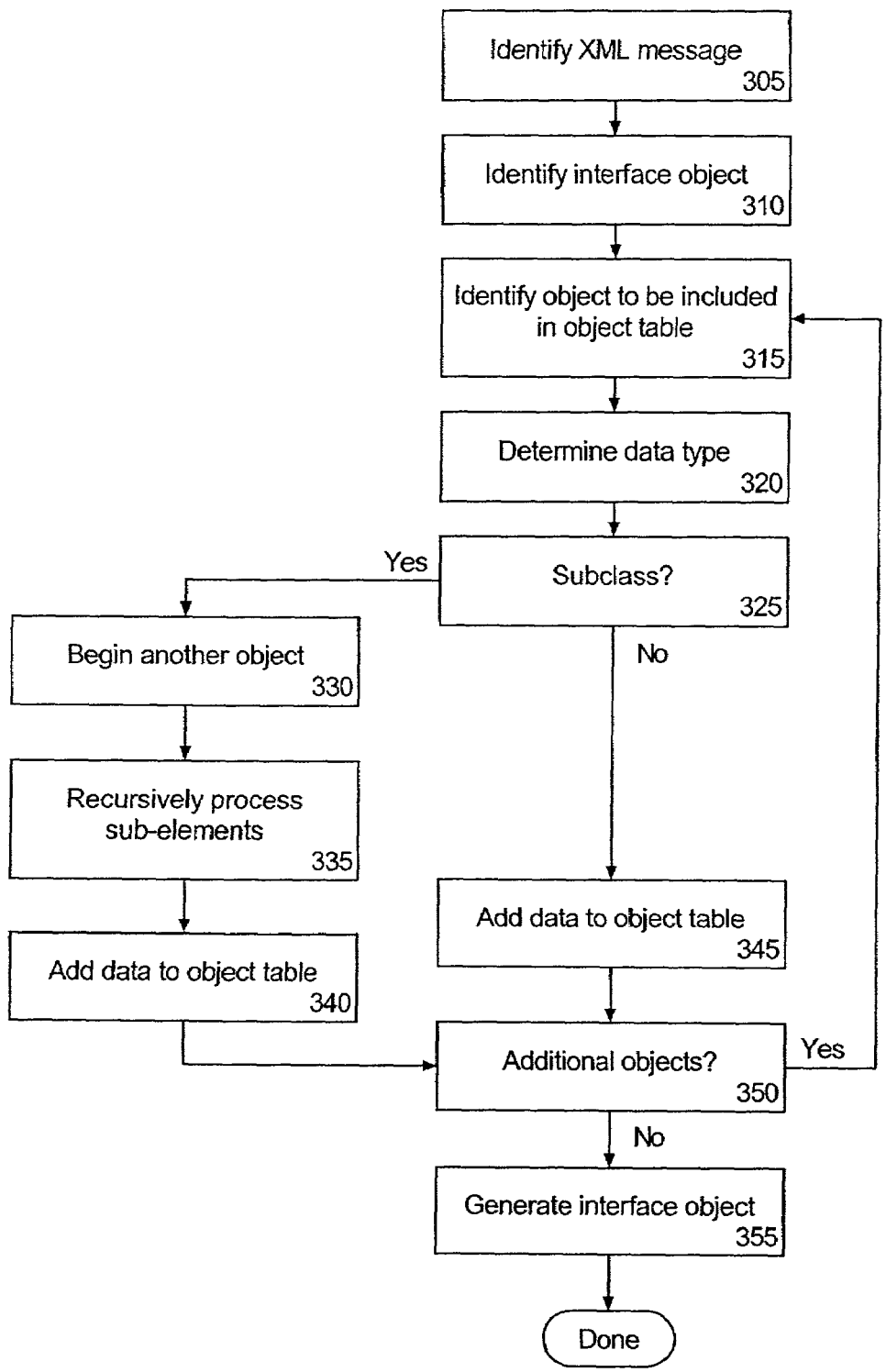
FIG. 3 is a flow chart illustrating a method of determining an object from a markup language representation of the object.

FIG. 3 is a flow chart illustrating a method of determining an interface object from a markup language representation of the interface object. The method can begin in step 305 where an XML message can be identified as requiring conversion to object format. For example, the XML message can be information which was received from another application or ERP system and has been format converted to an intermediate XML format used by the integration system. To route the data to its intended destination, an interface object as specified by the XML message must be generated and then sent to the appropriate ERP system.

In step 310, a particular type of data object can be identified from the XML message. The data object can be an object which is specific or proprietary to the ERP system to which the interface object to be generated will be provided. In step 315, an object to be included in the object table of the interface object can be identified from the elements of the XML representation or message. In step 320, the data type of the object can be identified from the XML representation. Attribute data specified by one or more elements of the XML representation can indicate the data type of the object represented by the XML message. For example, the XML message can be parsed to determine whether the interface object represents a string or object data type. In step 325, a further determination can be made as to whether the identified object is a subclass. The subclass determination can be performed by checking whether the field of the current object being processed, as specified by the elements of the XML message, is associated with sub-elements. If so, the method can continue to step 330. If not, the method can proceed to step 345.

In step 330, in the case where the object has been identified as a subclass, another object can be instantiated to accommodate the identified subclass. In step 335, the sub-elements associated with the element being processed can be recursively processed. In particular the sub-elements can be associated with the subclass identified in step 325. In step 340, the data determined for the particular subclass can be added to the object table. For example, the newly specified object from step 330 as well as the sub-elements and any other data identified such as the object identity and the data type can be included in the object table.

If the object being processed was not identified as a subclass, then the method can proceed to step 345 where the object can be listed in the object table as well as any determined interface object parameters. In step 350, a determination can be made as to whether additional objects specified in the XML message are to be processed. If so, the method can loop back to step 315 to process further objects. If no further objects are to be processed, the method can continue to step 355 where the interface object can be generated. Pseudo code illustrating the generation of an interface object from a markup language representation of the interface object is provided in Appendix A.

Similar to the method of FIG. 2, the method of FIG. 3 also indicates that the various objects can be added to the interface object or written to the object table as the elements of the XML message are processed. Those skilled in the art, however, will recognize that the elements and sub-elements can be temporarily stored and periodically written to the interface object or object table, or written to the interface object or object table after processing the entire XML representation of the interface object.

The present invention can be realized in hardware, software, or a combination of hardware and software. The present invention can be realized in a centralized fashion in one computer system, or in a distributed fashion where different elements are spread across several interconnected computer systems. Any kind of computer system or other apparatus adapted for carrying out the methods described herein is suited. A typical combination of hardware and software can be a general purpose computer system with a computer program that, when being loaded and executed, controls the computer system such that it carries out the methods described herein.

The present invention also can be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention can be embodied in other forms without departing from the spirit or essential attributes thereof. Accordingly, reference should be made to the following claims, rather than to the foregoing specification, as indicating the scope of the invention.

APPENDIX A

Generation of an XML representation of an interface object:

```
Enumeration keys = event.keys( );
Object fObj;
Sting field;
While (keys.hasMoreElements( )) {
    field = (String) keys.nextElement( );
    fObj = event.get(field);
    if (fObj instanceof IntegrationDataInterface) {//Check for subCLass
        genXMLDoc(csr, fObj);
    } else {
        csr.addElement(csr, field, (String)fObj); // Single piece of data
    }
}
```

Generation of interface object from XML representation:

```
String key;
Sting value;
While (csr.getElementNext( )) {
    // Sub-Element found
    If (csr.getElementFirst( )) {
        genErpObj(csr)
        // Process Element
    }else {
        key = csr.getElementName( );
        value = csr.getElementText( );
        event.setInputField(key, (Object)value);
    }
}
```

What is claimed is:

1. A method of automatically generating a markup language message from an application specific interface object comprising:

receiving an application specific interface object having corresponding data associated with the application specific interface object;

encapsulating integration instructions with said corresponding data and said application specific interface object;

accessing an object table specified by said application specific interface object, wherein the object table identifies one or more objects of the application specific interface object;

identifying one or more keys to said object table for determining said objects listed in said object table;

automatically identifying attributes of said objects listed in said object table;

recursively processing attributes of the objects and associating the corresponding data with the attributes;

serializing said objects by adding the attributes and the corresponding data as entries to a markup language message for representing said objects in said markup language message, wherein said integration instructions provide information to process said corresponding data with said application specific interface object contained in said markup language message during runtime.

2. The method of claim 1, said automatically identifying objects step further comprising:

registering a subscription for an integration event;

monitoring for said integration event, wherein said integration event specifies an integration schema for serializing the corresponding data, the one or more keys, and the application specific integration object; and upon detecting said integration event, determining whether said objects specified in said object table represent a subclass.

3. The method of claim 2, said automatically identifying objects step further comprising:

if said object is determined to represent a subclass, representing said subclass as a parent element within said markup language message;

identifying attributes of said subclass; and representing said attributes as sub-elements of said parent element within said markup language message.

4. The method of claim 3, said automatically identifying objects step further comprising:

representing non-subclass data objects as single entries in said markup language message.

5. The method of claim 1, wherein said markup language message is an extensible markup language message.

* * * * *